United States Patent [19]

Long, Sr.

[11] Patent Number: 5,798,067
[45] Date of Patent: Aug. 25, 1998

[54] METHOD FOR FORMING A CONCRETE REINFORCEMENT ELEMENT

[75] Inventor: Robert T. Long, Sr., Ames, Iowa

[73] Assignee: Composite Technologies Corporation, Ames, Iowa

[21] Appl. No.: 255,429

[22] Filed: Jun. 8, 1994

[51] Int. Cl.$^6$ ............................................. B32B 3/26
[52] U.S. Cl. ..................... 264/134; 264/136; 264/137; 156/167; 427/358; 427/388.5
[58] Field of Search ............................ 427/293, 358, 427/388.5, 387.8; 156/166, 244.11; 264/136, 109, 137, 174, 131, 134

[56]  References Cited

U.S. PATENT DOCUMENTS

| | | | |
|---|---|---|---|
| 3,470,051 | 9/1969 | Meyer | 156/171 |
| 3,934,064 | 1/1976 | Lowthian | 428/36 |
| 3,957,410 | 5/1976 | Goldworthy | 425/183 |
| 4,093,471 | 6/1978 | Greig | 106/99 |
| 4,462,946 | 7/1984 | Goldworthy | 264/23 |
| 4,486,373 | 12/1984 | Kurauchi et al. | 264/142 |
| 4,895,895 | 1/1990 | Osborne et al. | 525/28 |
| 5,031,846 | 7/1991 | Lee et al. | 242/7.22 |
| 5,294,461 | 3/1994 | Ishida | 427/293 |

*Primary Examiner*—Merrick Dixon
*Attorney, Agent, or Firm*—Zarley, McKee, Thomte, Voorhees, & Sease

[57]  ABSTRACT

An apparatus and method is provided for producing composite reinforcement elements having high tensile strength and anchoring points for retaining the elements in concrete or masonry. The apparatus includes a creel station having a plurality of fibers, and a placement station for arranging the fibers into a multi-fiber roving. The roving is passed through a resin bath for coating the roving with a corrosion resistant material. The coated roving is heated so as to partially cure the coating material. The roving is then continuously pulled through a rotary die station which imparts a desired shape or profile to the composite element. The element is also heated in the rotary die station so as to complete the curing process.

1 Claim, 4 Drawing Sheets

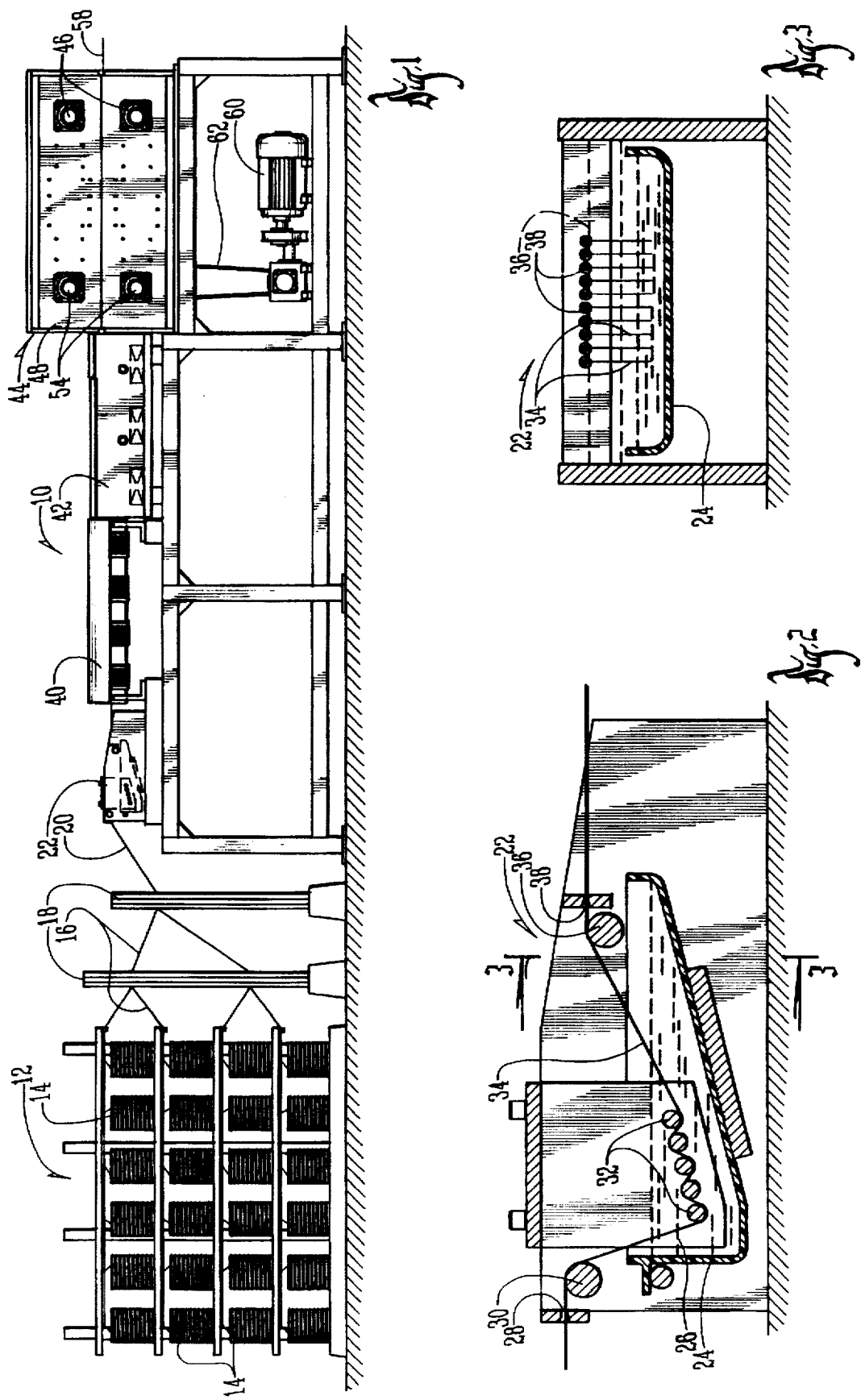

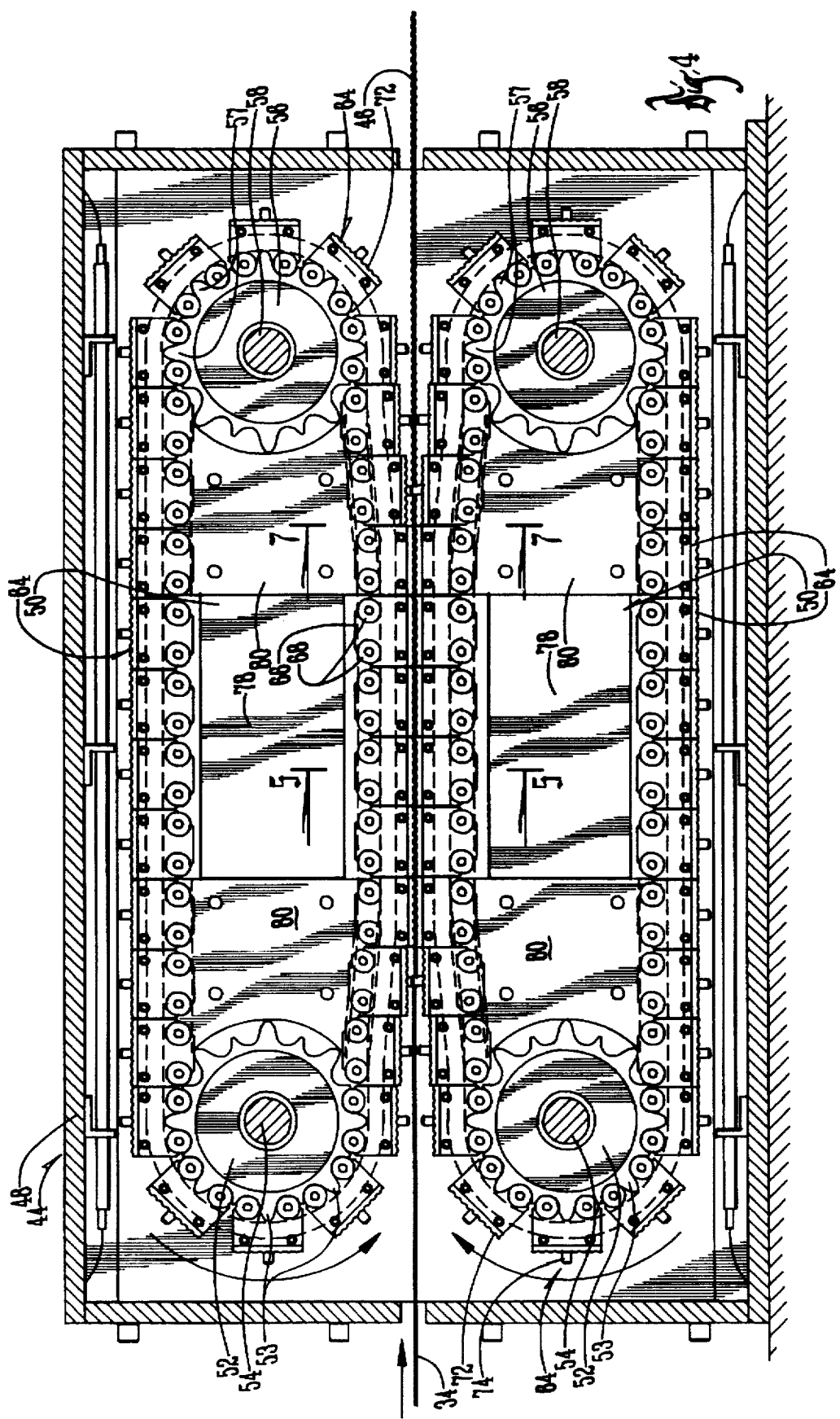

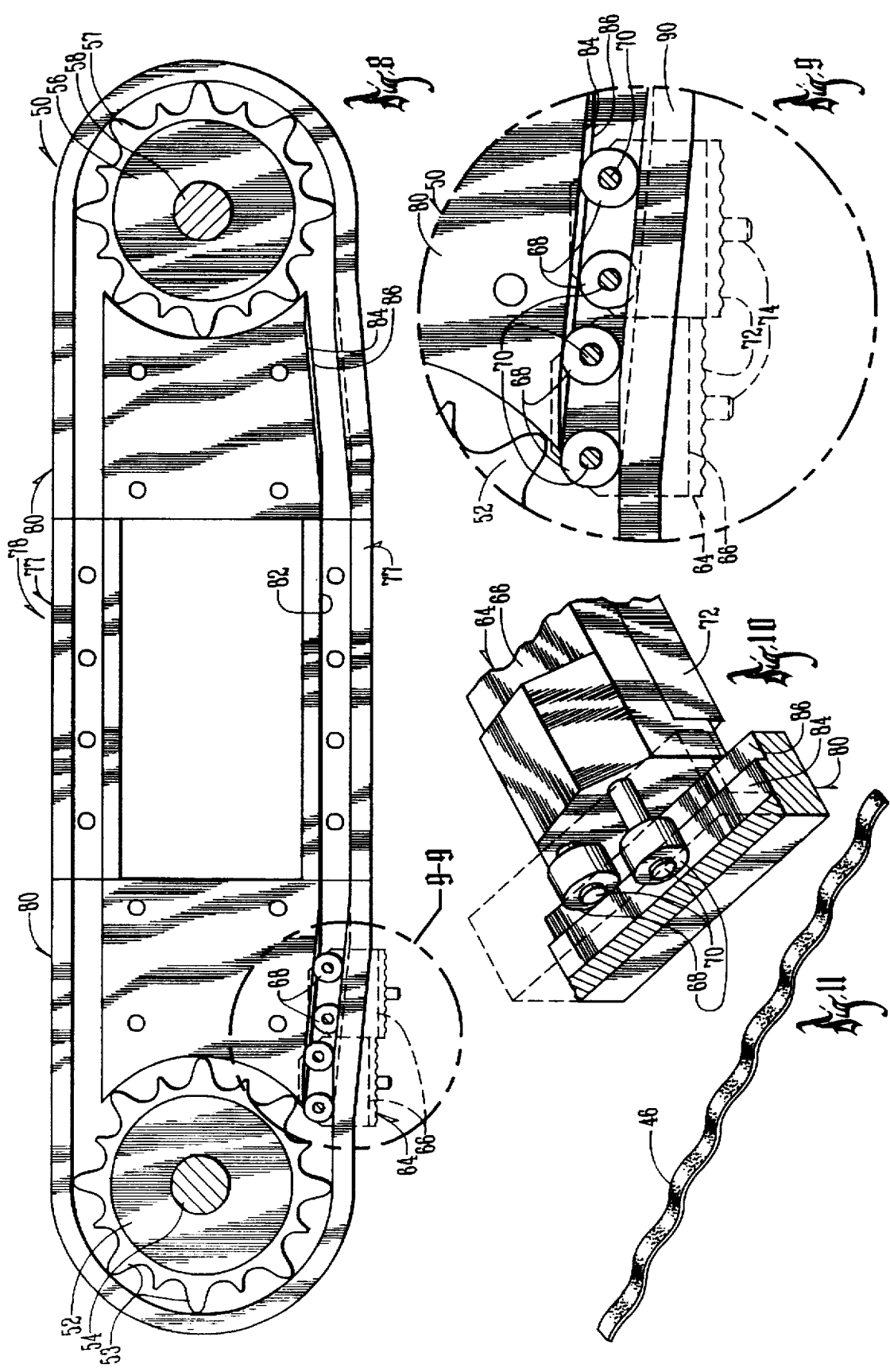

5,798,067

1

METHOD FOR FORMING A CONCRETE REINFORCEMENT ELEMENT

BACKGROUND OF THE INVENTION

Steel reinforcing elements have been used in the concrete and masonry industry for many years. However, the steel elements are prone to corrosion, which leads to degradation of the concrete structure. Such corrosion is present in both black steel and epoxy coated steel reinforcing elements. As an alternative to steel reinforcing elements, other materials have been used, such as glass fibers, and propylene fibers. However with glass fibers, a pH range of 12–14 degrades the fibers, and hydroxide crystals form on the fibers and produce brittleness of the fiber over time. Propylene fibers tend to slip out of concrete and masonry, since there is no way to shape the fiber to provide anchoring points.

Composite elements have also been used in the past as a reinforcement for concrete and masonry, due to the high tensile strength of such composite elements. In the composite industry, a fiber or plurality of fibers grouped to form a roving, are coated or impregnated with a resin. However, the bonding of the resin to the fibers requires matching and adhesives. The elements require a surface having mechanical anchorage points. In the past, anchorage points were formed in the composite element by a pultrusion process. However, there is a limited number of resins which are useful for a pultrusion process. Also, the pultrusion process has many disadvantages, including the limitation of a constant cross-section produced on the element, low production rates for all sizes of elements, with the production rates decreasing as the element size increases, increased tooling costs as element size increases, high maintenance costs, and expensive secondary processing to provide desired shaping to the elements. For example, the line speed is typically one-half foot to seven feet per minute.

Current pultrusion technology relies on fibers being towed or pulled through a resin bath and a temperature-controlled die, wherein energy from the heated die starts a chemical reaction to cure the resin. However, as the diameters of the coated roving increase, the line speed decreases, due to the rate at which the material can absorb energy. Also, the frictional forces on the die surfaces increase as the roving size increases, thus reducing line speed. Thus, the prior art pultrusion process used in forming composite elements is slow and does not produce an element having good anchorage points for use in concrete and masonry reinforcement.

Accordingly, a primary objective of the present invention is the provision of an improved composite reinforcement element, and an apparatus and method for producing such an element.

Another objective of the present invention is the provision of a composite reinforcement element having anchorage points for use in concrete and masonry.

A further objective of the present invention is the provision of an improved concrete and masonry reinforcing element formed by a pultrusion process using a continuously moving rotary die.

Still another objective of the present invention is the provision of an apparatus for producing composite reinforcement elements, including a continuously moving rotary die for shaping and curing the elements.

A further objective of the present invention is the provision of an apparatus and method for forming composite elements with variable cross sections for each design application, the apparatus and method having increased production rates, increased size capabilities, minimized tooling costs, reduced frictional wear, and decreased maintenance costs.

Another objective of the present invention is the provision of a method for producing a composite element, which method is useful with a wide variety of thermoset and thermoplastic resins.

Yet another objective of the present invention is the provision of an apparatus for producing composite elements, which apparatus is economical to manufacture, and durable, efficient and safe in use.

These and other objectives will become apparent from the following description of the invention.

SUMMARY OF THE INVENTION

The composite reinforcement elements of the present invention are corrosion resistant and have high tensile strength, for use in concrete and masonry construction. The elements include anchoring points for securing the elements in the concrete or masonry and preventing pull out from the concrete and masonry. The elements are a shaped profile made from resin coated rovings. The resin may be a thermoset or thermoplastic material, and is resistant to corrosion from salts, acids, alkalies, acid rain, and other corrosive chemicals.

The apparatus for manufacturing the composite reinforcement elements includes a creel station having a plurality of strands of fibers wound on spools. The fibers are arranged into rovings by a fiber placement system. Each roving is passed through a bath of the corrosion resistant material, and then heated to partially cure the material. The coated roving is then continuously moved through a rotary die station for forming the roving into a profile having a desired shape. The rotary die station is heated so as to finally cure or polymerize the coating material. The die molds follow an endless loop path.

In the method of the present invention for producing the composite reinforcement elements, the plurality of fiber strands from a creel station are arranged into a roving, and the roving bathed in a corrosion resistant material so as to coat the roving. The coated roving is heated to partially cure the material, and then moved continuously through a rotary die which induces a desired shape to the coated roving. The coated roving, and the resulting shaped profile, are heated during passage through the rotary die so as to finally cure the corrosion resistant material.

BRIEF DESCRIPTION OF THE DRAWINGS

FIG. 1 is a side elevation view of the apparatus of the present invention for producing composite reinforcement elements.

FIG. 2 is a side sectional view of the coating station.

FIG. 3 is a sectional view taken along lines 3—3 of FIG. 2.

FIG. 4 is a side sectional view of the rotary die station of the present invention.

FIG. 8 is a side elevation view of the rotary die guide track assembly.

FIG. 9 is an enlarged view taken along lines 9—9 of FIG. 8.

FIG. 10 is a partial perspective view of the rotary die of the present invention.

FIG. 11 is a perspective view of a composite reinforcement element produced by the apparatus and method of the present invention.

DETAILED DESCRIPTION OF THE DRAWINGS

Figure 5:
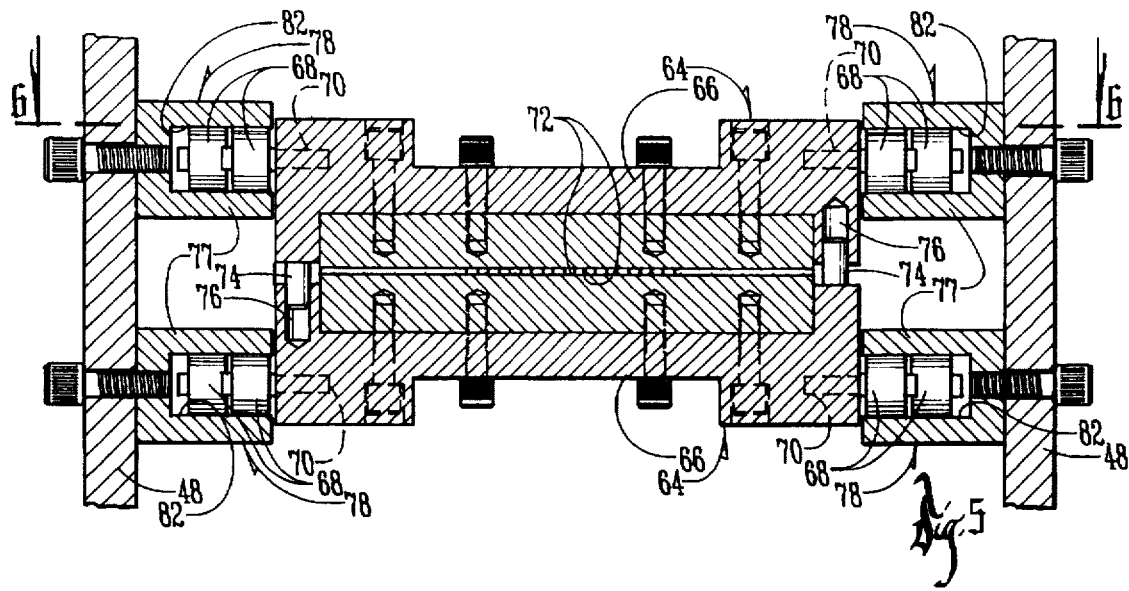
FIG. 5 is a sectional view taken along lines 5—5 of FIG. 4.
Figure 6:
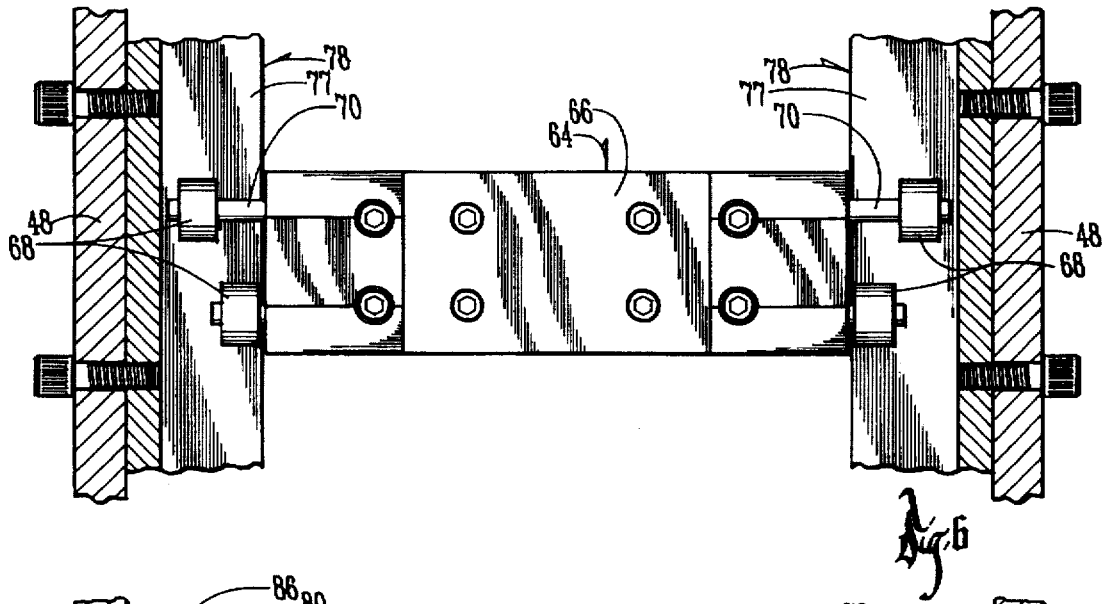
FIG. 6 is a view taken along lines 6—6 of FIG. 5.

The apparatus of the present invention is generally designated by the reference numeral 10, as seen in FIG. 1. The apparatus 10 includes a creel station 12 having a plurality of spools or reels 14 each containing an elongated strand of fiber 16 which can be dispensed from the reel or spool. A fiber placement station 18 arranges and positions the fibers adjacent to one another so as to form a multi-strand roving 20.

The apparatus 10 also includes a coating or bath station 22. More particularly, the bath station 22 includes a container or reservoir 24 for holding a coating material 26. The coating material is corrosion resistant. Preferably, the coating material is a thermoset or thermoplastic polymer, such as vinyl ester or polycarbonate resin. The bath station 22 includes an entrance opening or slot 28 for guiding the roving 20 over a first roller 30 and into the resin material 26. A plurality of rollers 32 reside below the surface of the coating material 26 and direct the roving 20 through a serpentine path, such that the roving is completely covered by the coating material. The coated roving 34 passes over an exit roller 36 and through an exit opening 38. The exit opening 38 may include brushes or other means for removing excess material from the coated roving 34. The size of the opening 38 is adjustable so as to obtain a proper ratio of coating material to fiber.

The apparatus 10 includes a pair of heat stations 40 and 42, through which the coated roving passes. The heat begins to cure the resin material 26. Depending on the type and nature of the coating material 26, the heat stations 40, 42 may begin polmerization of the material. While the drawings show two heat stations 40, 42, it is understood that one or more such sources of heat may be used to begin the curing of the coating material 26.

The apparatus 10 includes a rotary die station 44 through which the coated roving 34 passes to form the final profile or element 46. As seen in FIG. 4–9, the rotary die station 44 includes a pair of spaced apart frames 48 in which a pair of guide rail assemblies 50 are mounted. At one end of each guide rail assembly 50 is a drive gear or sprocket 52 having teeth 53 and being mounted upon a drive axle 54. At the opposite end of each guide rail 50 is an idler gear or sprocket 56 having teeth 57 and being rotably mounted upon an axle 58. The drive axles 54 are operatively connected to a motor 60 via a chain or belt 62, as seen in FIG. 1.

Figure 7:
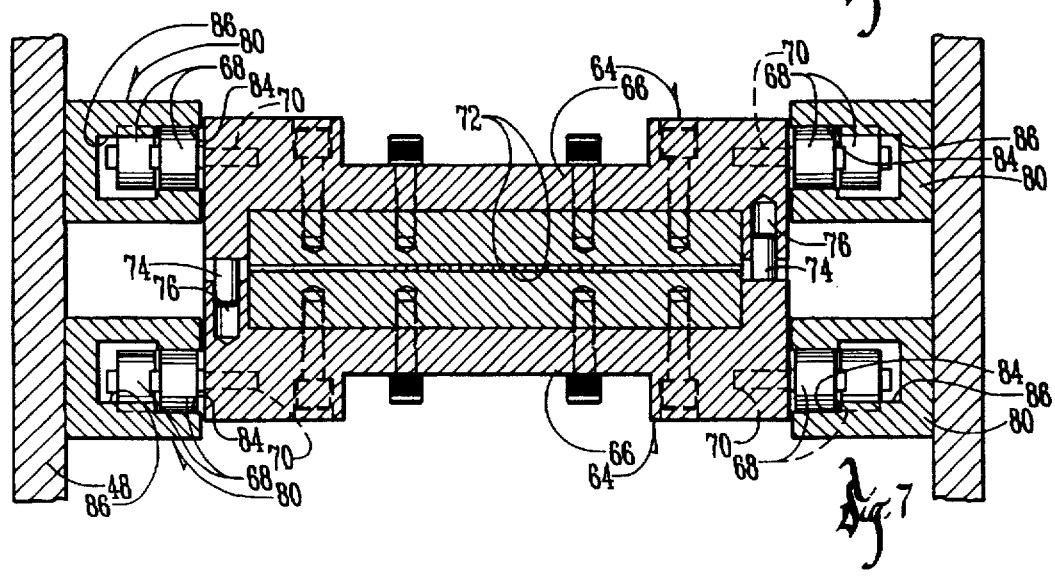
FIG. 7 is a sectional view taken along lines 7—7 of FIG. 4.

The guide rail assemblies 50 and gears 52, 56 define an endless loop track about which a plurality of die molds 64 are trained. More particularly, each die mold 64 includes a body 66 and a pair of spaced apart wheels 68 rotably mounted on axles 70. Each die mold 64 also includes a die surface 72 for imparting a desired shape to the reinforcement element. On one side of the die body 66 is an alignment pin 74 and on the opposite side is a hole 76, as best seen in FIGS. 5 and 7. Each die mold on one rail assembly is adapted to a line with a mirror image die mold on the opposite rail assembly, such that the alignment pin 74 on one die mold is received within the corresponding hole 76 on the opposite die mold.

As seen in FIGS. 5 and 7, axles 70 for the wheels 68 of the die molds 64 are coplanar. Each guide rail assembly 50 includes a pair of spaced apart C-shaped guide tracks 77 secured to the frames 48. The tracks 77 each have a central portion 78 and opposite end portions 80. The central portion 78 of the tracks 77 define track surfaces 82 which are parallel to one another. The opposite end portions 80 of the tracks 77 have an inner track surface 84 and an outer track surface 86, both of which are sloped towards the respective gear 52 or 56. As seen in FIGS. 7 and 9, the inner and outer tracks surfaces 84, 86 are offset with respect to one another such that the die mold wheels 68 are maintained in a horizontal orientation as the die mold 64 move along the end portions of the tracks 77. Accordingly, the die molds 64 come around the drive gear 52, approach one another in a parallel orientation along one end portion of the tracks 77, and ultimately matingly engage one another along the central portion 78 of the tracks 77, such that the die surfaces 72 instantaneously engage over their entire surface. Similarly, as the molds approach the opposite end of the tracks 77, the die surfaces disengage instantaneously and the die molds depart from one another in a parallel orientation towards gear 56. As seen in FIG. 4, the spacing between the die mold wheels 68 is sufficient to receive one of the teeth 53 or 57 on the respective gears 52 and 56.

To produce a composite reinforcement element 46 according to the present invention, a pultrusion process is utilized, wherein the fibers 16 from the creel station 12 are pulled into alignment through the fiber placement station 18 so as to form a multi-fiber roving 20. The roving 20 is pulled through the bath station 22 so as to be coated with the material 26. The coated roving 34 is pulled through the heat stations 40 and 42 so as to gradually heat the coating material, and thereby partially cure the material. Depending on the type of coating material, the curing may include polymerization of the material. The coated roving 34 is then pulled through the rotary die station 44 for shaping by the die molds 64. The rotary die station 44 is heated so as to finalize the curing of the coating material 26. After the profile element 46 exits the rotary die station, it can be cut to any desired length. Also, the profile element 46 can be bonded with other similar elements so as to form a net-like matrix or mat.

The endless loop path of the rotary die allows the apparatus to be operated at variable speeds, up to 1000 feet per minute, while minimizing frictional forces. The continuous induction of heat into the coating material in both the heat stations and the rotary die station allows different sized elements to be produced while maintaining high speed production rates.

Whereas the invention has been shown and described in connection with the perferred embodiment thereof, it is understood that many modifications, substitutes and additions may be made which are within the intended broad scope of the following claims. For example, the coating material can be applied in any convenient manner, such as the resin bath as shown and described, or a spray apparatus. Also, while the drawings show the die molds to have a wave-type die surface 72 which produces a wavy composite reinforcement element 46, as seen in FIG. 11, the die surfaces may have other shapes to produce elements having different configurations.

From the foregoing, it can be seen that the present invention accomplishes at least all of the stated objectives.

What is claimed is:

1. A method for producing composite reinforcement elements for concrete which have flat portions formed into a wavy non-planar profile so as to form anchorage points, comprising:

arranging a plurality of fiber strands into a roving;

coating the roving with a corrosion resistant material;

heating the coated roving to at least partially cure the coating material;

continuously moving the coated roving through a rotary die station and compressing the coated roving between opposing die molds moving in an endless loop path so as to form the roving into flat portions formed into a wavy non-planar profile which serve as anchorage points when embedded in concrete;

further comprising heating the die station to further cure the coating material;

wherein the die molds move parallel to one another along inner portions of the respective endless loop paths on parallel rails;

wherein the roving is coated with the coating material in a bath;

wherein the roving is moved along a serpentine path in the bath; and further comprising cutting the profile into desired lengths.

* * * * *